US008104033B2

(12) United States Patent
Chiaramonte et al.

(10) Patent No.: US 8,104,033 B2
(45) Date of Patent: Jan. 24, 2012

(54) MANAGING VIRTUAL MACHINES BASED ON BUSINESS PRIORTY

(75) Inventors: Michael R. Chiaramonte, Centereach, NY (US); Kouros H. Esfahany, Huntington, NY (US); Karthik V. Narayanan, Coram, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1561 days.

(21) Appl. No.: 11/241,155

(22) Filed: Sep. 30, 2005

(65) Prior Publication Data

US 2007/0079308 A1 Apr. 5, 2007

(51) Int. Cl.
*G06F 9/455* (2006.01)
*G06F 9/46* (2006.01)

(52) U.S. Cl. .......................................... 718/1; 718/104
(58) Field of Classification Search ................ 718/1, 104
See application file for complete search history.

(56) References Cited

U.S. PATENT DOCUMENTS

| 4,253,145 | A * | 2/1981 | Goldberg ..................... 703/21 |
| 5,742,762 | A | 4/1998 | Scholl et al. |
| 5,870,559 | A | 2/1999 | Leshem et al. |
| 5,889,523 | A | 3/1999 | Wilcox et al. |
| 6,115,646 | A | 9/2000 | Fiszman et al. |
| 6,122,664 | A | 9/2000 | Boukobza et al. |
| 6,145,001 | A | 11/2000 | Scholl et al. |
| 6,173,306 | B1 | 1/2001 | Raz et al. |
| 6,178,529 | B1 | 1/2001 | Short et al. |
| 6,226,273 | B1 | 5/2001 | Busuioc et al. |
| 6,304,864 | B1 | 10/2001 | Liddy et al. |
| 6,331,858 | B2 | 12/2001 | Fisher |
| 6,430,592 | B1 | 8/2002 | Davison |
| 6,505,217 | B1 * | 1/2003 | Venkatraman et al. ....... 707/205 |
| 6,530,840 | B1 | 3/2003 | Cuomo et al. |
| 6,691,176 | B1 | 2/2004 | Narin et al. |
| 6,694,419 | B1 | 2/2004 | Schnee et al. |
| 6,738,886 | B1 | 5/2004 | Mendoza et al. |
| 6,742,099 | B1 | 5/2004 | Mendoza et al. |

(Continued)

FOREIGN PATENT DOCUMENTS

WO      WO 01/38992      5/2001

(Continued)

OTHER PUBLICATIONS

Govil, K., et al., "Cellular Disco: resource management using virtual clusters on shared-memory multiprocessors," ACM 1-58113-140-2, XP-000919655, 16 pages, Dec. 1999.

(Continued)

*Primary Examiner* — Meng An
*Assistant Examiner* — Brian Chew
(74) *Attorney, Agent, or Firm* — Baker Botts L.L.P.

(57) ABSTRACT

According to one embodiment, a method for managing one or more virtual machines includes generating a request for at least one performance characteristic for at least one virtual machine, the at least one virtual machine being associated with a processing group, the processing group including one or more processing modules; receiving a response to the generated request for at least one performance characteristic for the at least one virtual machine; automatically determining whether an increase in the number of processing modules included in the processing group is required, by analyzing the received response to the generated request; and, in response to a determination that an increase in the number of processing modules included in the processing group is required, automatically adding at least one processing module to the processing group.

27 Claims, 7 Drawing Sheets

U.S. PATENT DOCUMENTS

| | | | |
|---|---|---|---|
| 6,745,312 | B1 | 6/2004 | Schnee et al. |
| 6,848,104 | B1 | 1/2005 | Van Ee et al. |
| 6,851,030 | B2 | 2/2005 | Tremaine |
| 6,853,738 | B1 | 2/2005 | Nishigaki et al. |
| 6,968,441 | B1 | 11/2005 | Schnee |
| 6,986,137 | B1* | 1/2006 | King et al. ............. 718/104 |
| 7,080,379 | B2 | 7/2006 | Brenner et al. ............. 718/105 |
| 7,299,468 | B2 | 11/2007 | Casey et al. |
| 7,308,687 | B2 | 12/2007 | Trossman et al. ............. 718/104 |
| 7,483,978 | B2 | 1/2009 | Esfahany et al. |
| 7,673,114 | B2 | 3/2010 | Allen et al. |
| 2001/0028729 | A1 | 10/2001 | Nishigaki et al. |
| 2002/0087611 | A1* | 7/2002 | Tanaka et al. ............. 709/1 |
| 2002/0091702 | A1 | 7/2002 | Mullins |
| 2002/0173863 | A1 | 11/2002 | Imada et al. ............. 700/83 |
| 2002/0184171 | A1 | 12/2002 | McClanahan |
| 2003/0009543 | A1 | 1/2003 | Gupta ............. 709/223 |
| 2003/0037092 | A1 | 2/2003 | McCarthy et al. |
| 2003/0158884 | A1 | 8/2003 | Alford, Jr. ............. 709/104 |
| 2003/0182597 | A1 | 9/2003 | Coha et al. |
| 2003/0214525 | A1 | 11/2003 | Esfahany |
| 2003/0233571 | A1 | 12/2003 | Kraus et al. |
| 2004/0143664 | A1 | 7/2004 | Usa et al. |
| 2004/0154018 | A1* | 8/2004 | Doering et al. ............. 718/100 |
| 2004/0221121 | A1 | 11/2004 | Hamilton, II et al. ............. 711/170 |
| 2004/0221290 | A1* | 11/2004 | Casey et al. ............. 718/104 |
| 2004/0250248 | A1 | 12/2004 | Halpern et al. ............. 718/100 |
| 2005/0015661 | A1 | 1/2005 | Vaidyanathan ............. 714/13 |
| 2005/0038989 | A1* | 2/2005 | Esfahany ............. 713/100 |
| 2005/0044301 | A1 | 2/2005 | Vasilevsky et al. ............. 711/1 |
| 2005/0081201 | A1 | 4/2005 | Aguilar, Jr. et al. ............. 718/100 |
| 2005/0120160 | A1* | 6/2005 | Plouffe et al. ............. 711/1 |
| 2005/0131941 | A1 | 6/2005 | Dettinger et al. |
| 2005/0132362 | A1 | 6/2005 | Knauerhase et al. ............. 718/1 |
| 2005/0262504 | A1 | 11/2005 | Esfahany et al. |
| 2005/0262505 | A1 | 11/2005 | Esfahany et al. |
| 2005/0289145 | A1 | 12/2005 | Voegel |
| 2006/0017969 | A1 | 1/2006 | Ly et al. ............. 358/1.15 |
| 2006/0020781 | A1 | 1/2006 | Scarlata et al. |
| 2006/0069761 | A1* | 3/2006 | Singh et al. ............. 709/222 |
| 2006/0136912 | A1 | 6/2006 | Robinson et al. ............. 718/1 |
| 2006/0242641 | A1* | 10/2006 | Kinsey et al. ............. 718/1 |
| 2006/0265711 | A1 | 11/2006 | Bantz et al. ............. 718/1 |
| 2007/0055647 | A1 | 3/2007 | Mullins et al. |
| 2007/0079308 | A1 | 4/2007 | Chiaramonte et al. |
| 2007/0094367 | A1 | 4/2007 | Esfahany et al. |
| 2007/0106769 | A1 | 5/2007 | Liu ............. 709/223 |
| 2007/0266136 | A1 | 11/2007 | Esfahany et al. |

FOREIGN PATENT DOCUMENTS

| | | |
|---|---|---|
| WO | WO 02/088938 | 11/2002 |
| WO | WO 03/071424 | 8/2003 |
| WO | WO 03/088046 A1 | 10/2003 |

OTHER PUBLICATIONS

PCT, Notification of Transmittal of the International Search Report and the Written Opinion of the International Searching Authority, or the Declaration, PCT/US2006/038055, 12 pages, Mailed Feb. 1, 2007.

Computer Associates; Unicenter NSM Dynamic Reconfiguration Option; Complete Management Solution for High-End to Mid-Range Servers; 24 pages, 2003.

Computer Associates; Unicenter NSM Dynamic Reconfiguration Option; Complete Management Solution for High-End to Mid-Range Servers; 28 pages, Apr. 22, 2003.

Computer Associates; Unicenter NSM Dynamic Reconfiguration Option; Getting Started Guide 3.0; 25 pages, Apr. 2003.

Computer Associates; Unicenter NSM Dynamic Reconfiguration Option; Managing On-Demand Computing; 59 pages, Jun. 26, 2003.

Computer Associates; Unicenter Dynamic Reconfiguration Option; 1 page, 2003.

Computer Associates; Unicenter NSM Dynamic Reconfiguration Option 3.0; High-End & Midframe Server Discovery, Monitoring & Administration Solution; CA Development Buddy Program; 10 pages, 2003.

Computer Associates; Managing Enterprise Clusters and Dynamic System Domains; Session Code: ENT07SN; 47 pages, 2003.

Managing Dynamic System Domains with Unicenter DRO; 22 pages, 2003.

Jeannette Lawrence, "Introduction to Neural Networks," Design, Theory, and Applications, 1994 California Scientific Software Press, 6th Edition, 4 pages.

Communication—Supplementary European Search Report in Application No. 02752185.5-1243, dated Apr. 27, 2007, 3 pages.

Omer F. Rana et al, "Resource Discovery for Dynamic Clusters in Computational Grids," XP-002429542, IEEE, 2001, 9 pages.

PCT, Notification of Transmittal of the International Search Report and Written Opinion of the International Searching Authority, or the Declaration, PCT/US2006/040918, 10 pages, Jan. 31, 2007.

Platform Computing, Inc., "An Introduction to Platform VM Orchestrator. Extract More Value from a Virtual Server Environment Through Automated Management", XP002415478, 13 pages, Oct. 1, 2005.

Gamma et al., "Design Patterns Elements of Reusable Object-Oriented Software", XP002261440, 24 pages, 1997.

VMware, Inc., "VMware VirtualCenter User's Manual Version 1.0", XP002407050, retrieved from the internet http://www.vmware.com/pdf/VirtualCenter_Users_Manual.pdf, retrieved on Aug. 16, 2005, 143 pages.

Notification of Transmittal of the International Search Report and the Written Opinion of the International Searching Authority for International Application No. PCT/US2005/014269, filed Apr. 25, 2005, dated Nov. 16, 2005, 12 pages.

Notification of Transmittal of the International Search Report and the Written Opinion of the International Searching Authority, or the Declaration; International Application No. PCT/US2005/014270 dated Aug. 8, 2005, 11 pages.

EPO Communication Pursuant to Article 96(2) EPC; Application No. 05 739 911.5-1243; Ref. HCD/J00049340EP, Sep. 6, 2007, 6 pages.

Computer Associates; Unicenter Advanced Systems Management (UASM) r11, 47 pages, 2005.

USPTO Office Action for U.S. Appl. No. 11/435,347, in the name of Kouros H. Esfahany, Apr. 22, 2008.

USPTO Office Action for U.S. Appl. No. 11/114,275, inventor Kouros H. Esfahany, 12 pages, May 8, 2009.

Object-based Virtual Infrastructure Management; U.S. Appl. No. 11/255,056, filed Oct. 19, 2005 (2709).

Method and Apparatus for Dynamic Memory Resource Management; U.S. Appl. No. 11/114,749, filed Apr. 25, 2005 (6806).

Method and Apparatus for Dynamic CPU Resource Management; U.S. Appl. No. 11/114,275, filed Apr. 25, 2005 (6807).

System and Method for Managing Object Based Clusters; U.S. Appl. No. 10/190,759, filed Jul. 8, 2002 (7027).

Intel; White Paper; Easy-attach Storage; Making SAN Affordable; 8 pages, 2004.

White Paper; Building Virtual Infrastructure with VMware VirtualCenter; Virtual Infrastructure Software for the Responsive Enterprise; vmware; 10 pages, 2004.

USPTO Office Action for U.S. Appl. No. 11/114,275, inventor Kouros H. Esfahany, 14 pages, Dec. 4, 2009.

USPTO Office Action for U.S. Appl. No. 11/255,056, inventor Kouros H. Esfahany, 24 pages, Nov. 27, 2009.

USPTO Office Action for U.S. Appl. No. 11/114,749, inventor Esfahany, 11 pages, Jan. 20, 2010.

USPTO Office Actionl for U.S. Appl. No. 11/114,275, inventor Esfahany, 14 pages, Mar. 8, 2010.

USPTO Office Action, U.S. Appl. No. 11/114,749, filed Apr.25, 2005, inventor Kouros H. Esfahany, 14 pages, Apr. 16, 2010.

USPTO Advisory Action, U.S. Appl. No. 11/114,275, filed Apr. 25, 2005, inventor Kouros H. Esfahany; 2 pages, Apr. 21, 2010.

USPTO Final Office Action, U.S. Appl. No. 11/255,056, filed Oct. 19, 2005, inventor Kouros H. Esfahany; 14 pages, Apr. 28, 2010.

USPTO Notice of Allowance, U.S. Appl. No. 11/114.749, filed Apr. 25, 2005, 16 pages, Oct. 1, 2010.

USPTO Notice of Allowance, U.S. Appl. No. 11/114,749, filed Apr. 25, 2005, 6 pages, Dec. 23, 2010.

USPTO Notice of Allowance, U.S. Appl. No. 11/114,275, filed Apr. 25, 2005; 4 pages, Oct. 4, 2010.

USPTO Notice of Allowance, U.S. Appl. No. 11/114,275, filed Apr. 25, 2005; 6 pages, Dec. 20, 2010.

USPTO Office Action, U.S. Appl. No. 11/255,056, filed Oct. 19, 2005; Mar. 21, 2011.

* cited by examiner

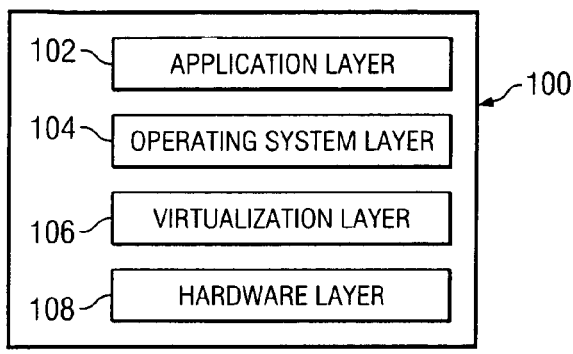
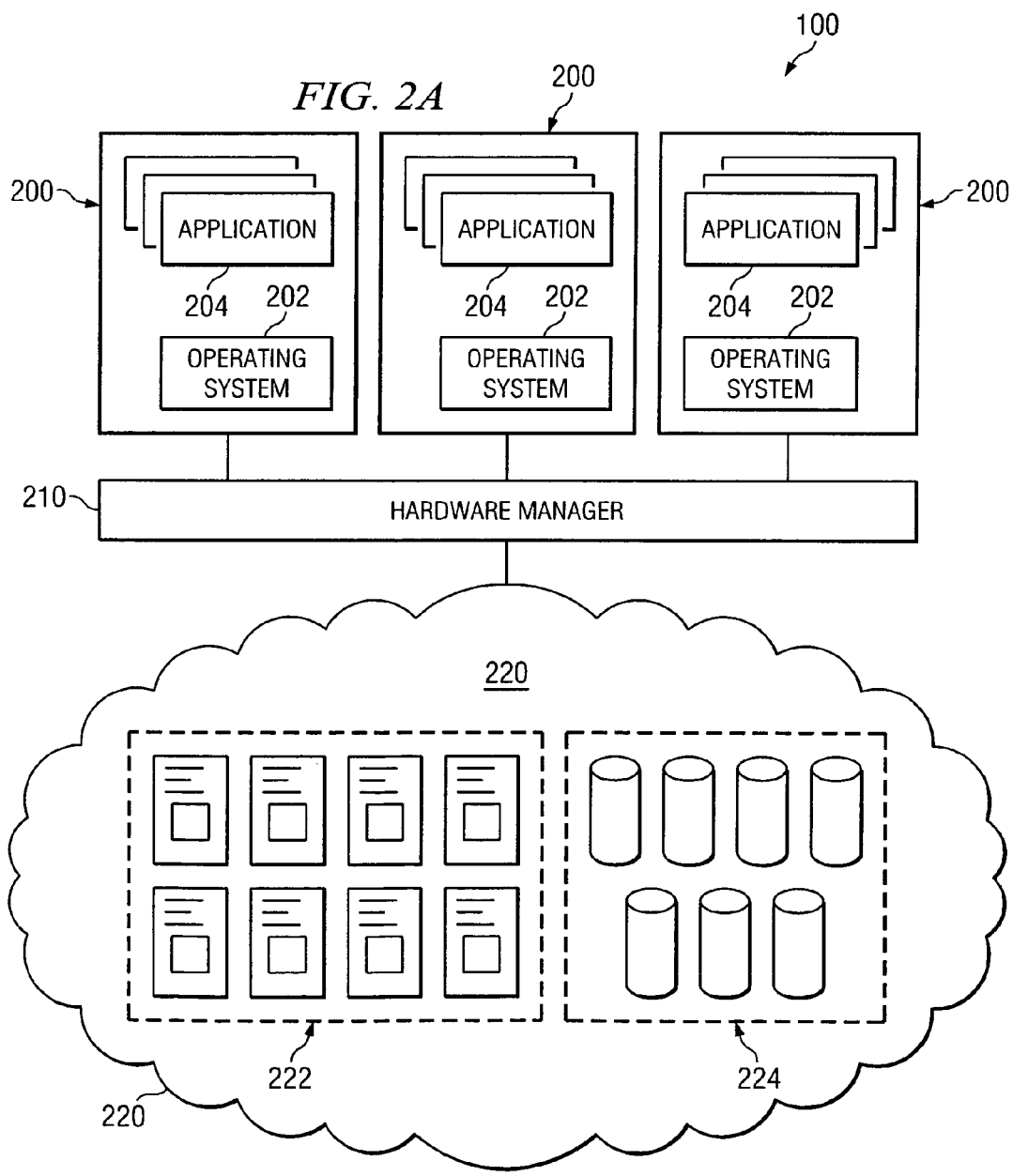

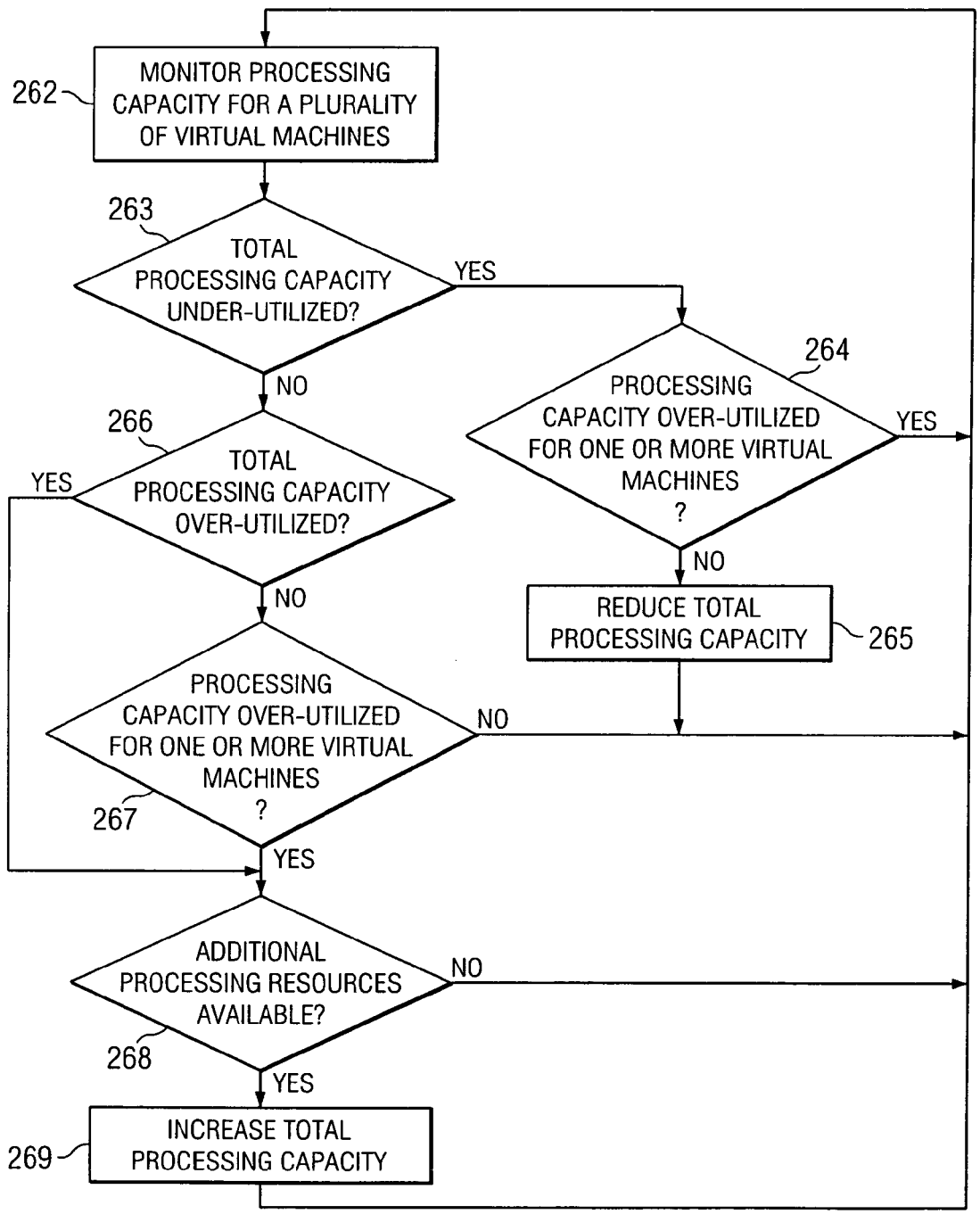

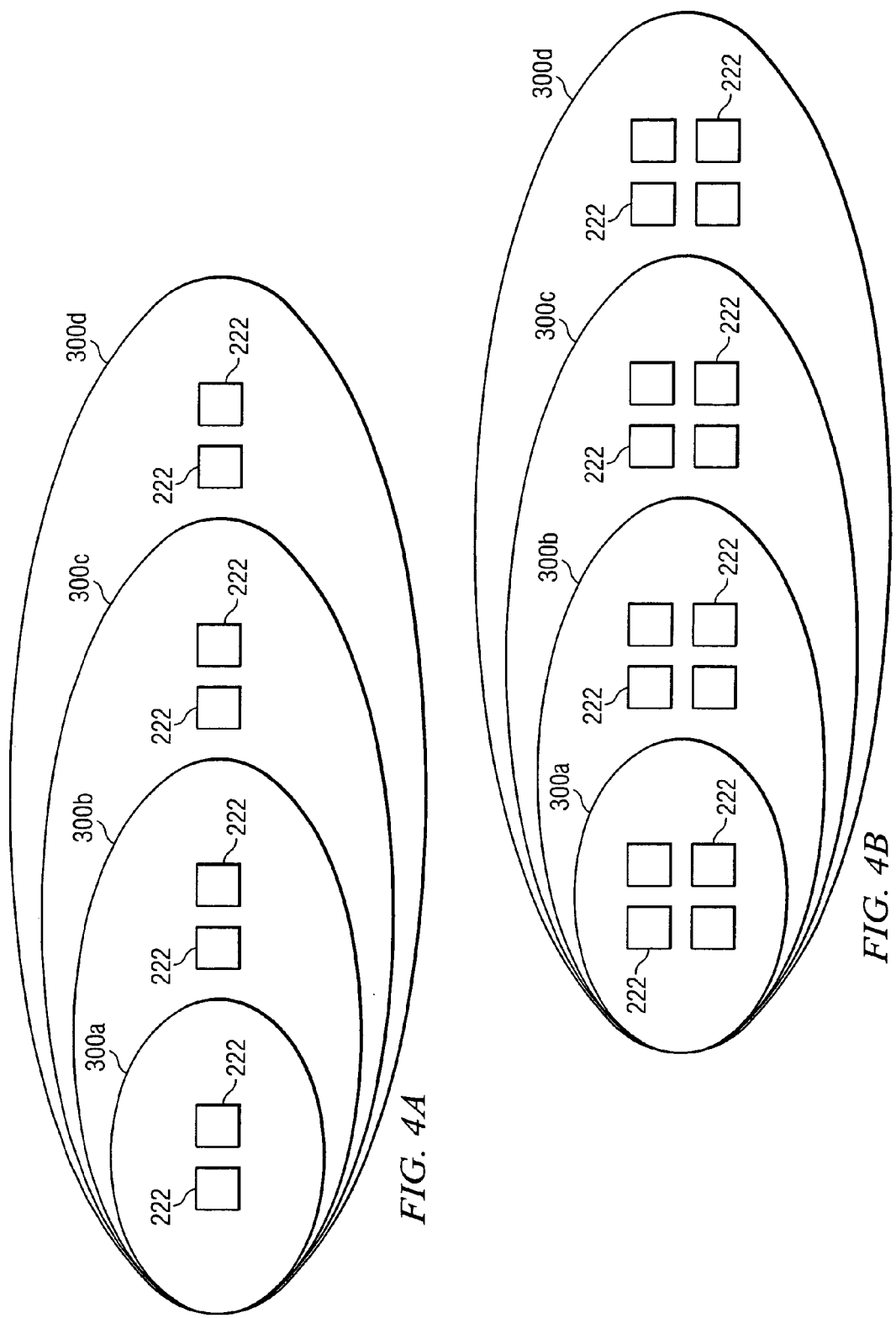

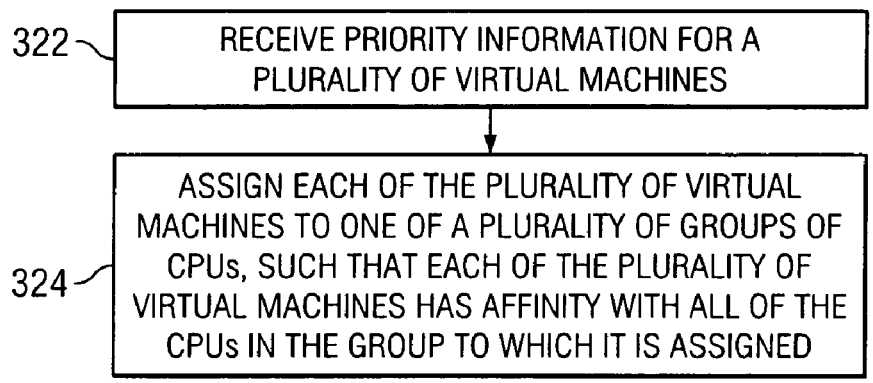
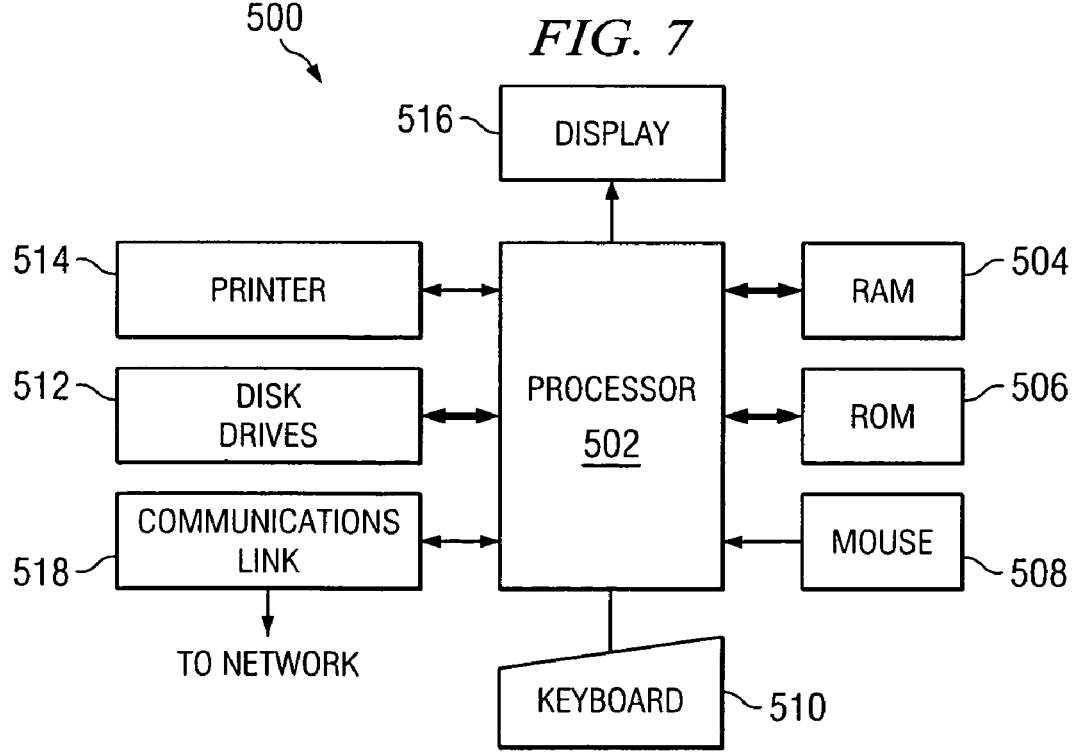

MANAGING VIRTUAL MACHINES BASED ON BUSINESS PRIORTY

TECHNICAL FIELD OF THE INVENTION

This invention relates generally to computer systems and more particularly to managing virtual machines.

BACKGROUND OF THE INVENTION

Systems management involves the supervision and management of information technology resources in an enterprise (or other organization). For example, systems management software may include tools for monitoring and collecting information regarding resource usage. As enterprises grow, their needs for information technology resources can change rapidly. These changing needs are often due, in part, to increasing demands for performance and reliability from their information technology resources. One approach for addressing such growing demands is to consolidate information technology hardware in order to maximize available resources. For example, numerous applications can be consolidated on a reduced number of high performance servers or on a single high performance server running multiple virtual machines.

A virtual machine is typically a logical entity that is implemented over a hardware platform and operating system and can use multiple resources (such as memory, processors, network systems, etc.) to create virtual systems, each of which can run independently as a copy of the operating system. In other words, a virtual machine can be thought of as a computer that operates inside one or more hardware systems, such as a server. Each virtual machine can operate independently of other virtual machines and yet utilize the same hardware resources. Virtual machines can provide flexibility across platforms and can provide performance optimization by allowing efficient hardware to be shared to average out resource demands and benefit from economies of scale.

Virtual machine software, such as VMWARE ESX SERVER ("ESX"), can be used to consolidate systems in advanced environments. Such systems may include individual computers, servers, networks, and other computing resources. For example, ESX can provide a virtualization software tool that deploys multiple, secure, isolated virtual machines, with respective allocated memory shares and/or processor shares, on a single system where a user can specify system resource allocations for any virtual machine as needed. However, if system resources are over-allocated, under-utilization of system resources can be expected. On the other hand, under-allocating resources, which may result in scarcity, is also problematic.

SUMMARY

According to one embodiment, a method for managing one or more virtual machines includes generating a request for at least one performance characteristic for at least one virtual machine, the at least one virtual machine being associated with a processing group, the processing group including one or more processing modules; receiving a response to the generated request for at least one performance characteristic for the at least one virtual machine; automatically determining whether an increase in the number of processing modules included in the processing group is required, by analyzing the received response to the generated request; and, in response to a determination that an increase in the number of processing modules included in the processing group is required, automatically adding at least one processing module to the processing group.

Certain embodiments of the present invention may provide various technical advantages. For example, certain embodiments may provide an effective tool for dynamically managing system resources for virtual machines in a virtual environment. Such dynamic management may improve hardware utilization, increase performance, and/or lower the costs associated with buying, leasing, and/or maintaining hardware elements. As another example, certain embodiments may provide greater control over the performance of virtual machines by one or more users.

Other technical advantages of the present invention will be readily apparent to one of skill in the art from the following figures, descriptions, and claims. Moreover, while specific advantages have been identified above, various embodiments may include some, none, or all of the identified advantages.

BRIEF DESCRIPTION OF THE FIGURES

For a more complete understanding of the present invention and its advantages, reference is now made to the following description, taken in conjunction with the accompanying drawings, in which:

FIG. 1 is block diagram illustrating example architecture for a virtual infrastructure;

FIG. 2A is a block diagram illustrating an example virtual infrastructure, including multiple virtual machines and multiple hardware resources, according to particular embodiments;

FIGS. 3A-3B are flowcharts illustrating example methods for managing one or more virtual machines, according to particular embodiments;

FIGS. 4A-4C illustrate example techniques for assigning resource affinity in a virtual infrastructure, according to particular embodiments;

FIG. 6 is a flowchart illustrating an example method for managing one or more virtual machines, according to particular embodiments; and FIG. 7 illustrates a general purpose computer.

DETAILED DESCRIPTION OF EXAMPLE EMBODIMENTS

Figure 2B:
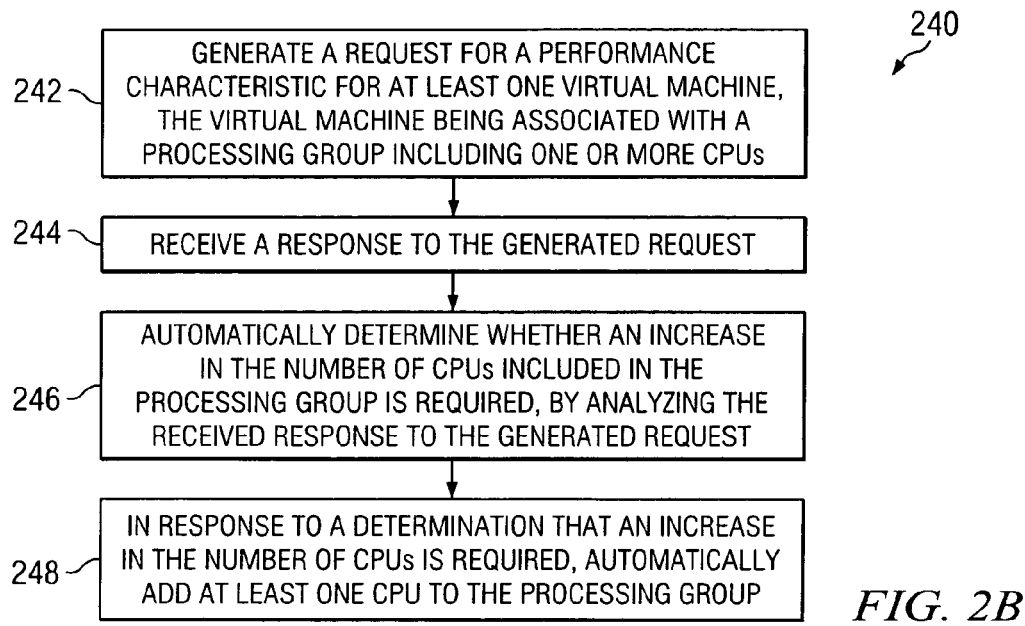
FIG. 2B is a flowchart illustrating an example method for managing one or more virtual machines, according to particular embodiments.

Embodiments of the present invention and its advantages are best understood by referring to FIGS. 1 through 5 of the drawings, like numerals being used for like and corresponding parts of the various drawings. However, it should be understood at the outset that although example implementations of embodiments of the invention are illustrated below, the present invention may be implemented using any number of techniques, whether currently known or not. The present invention should in no way be limited to the example implementations, drawings, and techniques illustrated below.

FIG. 1 is block diagram illustrating an example architecture for a virtual infrastructure 100. In the embodiment shown, virtual infrastructure 100 includes application layer 102, operating system layer 104, virtualization layer 106, and hardware layer 108.

Application layer 102 may represent one or more applications running on one or more virtual machines. For example, application layer 102 may represent a data processing application, a word processor, a CAD application, or any other appropriate application.

Operating system layer 104 may represent one or more operating systems. For example, operating system layer 104 may represent any appropriate version of Windows, Macintosh, Linux, UNIX, AIX, etc. In certain embodiments, such as with particular database server applications, operating system layer 104 and application layer 102 may be substantially the same.

Hardware layer 108 may represent processing hardware, storage hardware, networking hardware, input/output hardware, and any other appropriate hardware which may be allocated among multiple virtual machines. For example, hardware layer 108 may represent a plurality of central processing units (CPUs) and a plurality of storage units, such as magnetic tape drives. In certain embodiments, hardware layer 108 may include a storage-area-network (SAN)-attached 8-way system with Gigabit Ethernet cards. In an alternative embodiment, hardware layer 108 may include a direct-attached blade server sharing a network switch.

Virtualization layer 106 may represent a layer of abstraction separating application layer 102 and operating system layer 104 from hardware layer 108. Virtualization layer 106 may represent one or more virtual hardware elements, mapped to one or more hardware elements within hardware layer 108. Although any appropriate virtualization products may be used to provide virtualization layer 106, in certain embodiments, virtualization layer 106 is provided by VMWARE ESX SERVER.

In operation, virtualization layer 106 allows each of the components within hardware layer 108 to be treated as a single pool of resources. Virtualization layer 106 may allow a single application to utilize multiple hardware components, such as for example utilizing multiple CPUs. Similarly, virtualization layer 106 may allow multiple applications to share a single hardware component. In certain embodiments, the hardware components allocated to one or more applications may change over time, without interrupting the one or more applications. Through the use of virtualization layer 106, the hardware components within hardware layer 108 may be managed independently of any application management. In certain embodiments, virtualization layer 106 may provide a hardware image which may be utilized by application layer 102 and operating system layer 104. In certain embodiments, this hardware image, which may be duplicated numerous times for different operating systems and applications, may be mapped to physical hardware (or portions thereof) located within hardware layer 108. Additional details for particular implementations of virtual infrastructure 100 are included below in relation to FIGS. 2A and 2B.

FIG. 2A is a block diagram illustrating an example virtual infrastructure 100 according to particular embodiments. In the embodiment shown, virtual infrastructure 100 includes multiple virtual machines 200, hardware manager 210, network 220, CPUs 222, and storage modules 224.

Virtual machine 200 may represent a logical entity that simulates a fully functional physical machine, such as an intel-based computer. In certain embodiments, virtual machine 200 may couple memory, processing, and other hardware components to provide this simulation. In certain embodiments, multiple virtual machines 200 may share one or more hardware components in hardware layer 108, yet each virtual machine 200 may operate as a separate entity independent of the other virtual machines 200 that may share the same components. In the embodiment shown, virtual machine 200 includes an operating system 202 and one or more applications 204.

Operating system 202 may represent a Windows operating system, a Macintosh operating system, a Linux operating system, a UNIX operating system, or any other appropriate operating system, whether currently known or not. Application 204 may represent any appropriate application capable of running on operating system 202. For example, application 204 may represent a data processing application, a word processing application, a database application, a graphics application, or any other appropriate application, whether currently known or not.

Hardware manager 210 may represent one or more software programs that operate to establish the one or more virtual machines 200, to host the one or more operating systems, and to allocate one or more hardware components. In certain embodiments, hardware manager 210 may represent the one or more programs which provide the functionality of virtualization layer 106. In certain embodiments, hardware manager 210 may be loaded on one or more physical machines, such as a server. Although any appropriate virtualization software may be used, in certain embodiments, hardware manager 210 may represent VMWARE ESX SERVER or VMWARE ESX SERVER together with one or more additional applications.

Network 220 may represent any appropriate hardware and or controlling logic for connecting components of hardware layer 208. For example, network 220 may represent any appropriate combination of switches, routers, hubs, wires, and/or cables. For example, network 220 may represent a high bandwidth network, such as InfiniBand, PCI-Express, Ethernet, Gigabit Ethernet, 10 Gigabit Ethernet, etc. In certain embodiments, network 220 may represent a local area network (LAN) or a wide area network (WAN).

CPU 222 may represent any appropriate processor. For example, CPU 222 may represent a computer with one or more physical processors, such as an x86 processor, a RISC processor, etc. As another example, CPU 222 may represent a single processor included with other processors in a server. As yet another example, in certain embodiments, CPU 222 may be one of multiple processors included on a single chip.

Memory module 224 may represent a storage device for storing computer data. For example, memory module 224 may represent one or more hard drives, disc drives, tape drives, etc. In certain embodiments, memory module 224 may represent a single hard drive included with an array of multiple hard drives. In certain embodiments, memory module 224 may represent an array of multiple storage devices, or memory module may represent a portion of a single storage device, such as in the case of a partitioned drive.

In the description provided below, examples are provided that focus on the use, monitoring, and allocation of processing hardware, in the form of CPUs 222; however the present invention contemplates similar use, monitoring, and allocation of other hardware elements, including, but not limited to, memory modules 224.

In operation, hardware manager 210 provides for each of the one or more virtual machines 200, such that each virtual machine 200 may operate using a different ("guest") operating system 202. Each virtual machine 200 is provided with emulated hardware, which is mapped to physical hardware components. This mapping function, or hardware "affinity," may change over time. For example, a particular virtual machine 200 may have an affinity with a first particular CPU 222. An administrator may then change that particular virtual machine 200's affinity to a second CPU 222, so that maintenance may be performed on the first CPU 222. In certain embodiments, this affinity change may be done without any interruption to applications 204 running on the particular virtual machine 200.

In certain embodiments, threshold levels may be established which, if exceeded, may trigger a change in hardware element affinity for one or more virtual machines 200. For example, an upper threshold may be set at 75 percent of processing capacity and a lower threshold may be set at 25 percent of processing capacity. (Similar thresholds may be set for other hardware related characteristics.) In this embodiment, if it is determined that one or more virtual machines 200 are utilizing more than 75 percent of their processing capabilities, then it may be determined that the CPUs 222 with which the virtual machines 200 have affinity can be identified as over-utilized. Similarly, if it is determined that one or more virtual machines 200 are utilizing less than 25 percent of their processing capabilities, then it may be determined that the CPUs 222 with which the virtual machines 200 have affinity can be identified as under-utilized. In alternative embodiments, any appropriate threshold values may be set for one or more virtual machines 200. In addition, threshold values may change over time and may be based upon a multi-variable determination, and/or upon other external factors.

In certain embodiments, priority levels may be assigned to certain virtual machines 200 and/or to certain applications 204. In certain embodiments, through the use of priorities, the allocation of hardware resources may be tied to one or more business priorities and/or business needs. In certain embodiments, priority for a particular virtual machine may be computed based on user defined criteria. For example, this user defined criteria may be related to one or more business needs. In certain embodiments, a priority level for a virtual machine 200 may be calculated based on changing characteristics. For example, in a particular embodiment, the overall priority for a particular virtual machine 200 may be calculated based on a set priority rating for the particular virtual machine 200, together with the priority ratings for the various applications 204 currently running on that particular virtual machine 200. For example, suppose a particular virtual machine 200 has a set priority of "2" regardless of what applications 204 it is running, and the particular virtual machine 200 is also running an application 204 with a "+3" priority rating and an application 204 with a "+2" priority rating, then that particular virtual machine 200 would have an overall priority rating of "7". (2+3+2=7).

In certain embodiments, hardware manager 210, or one or more other programs, may monitor certain parameters of virtual machines 200 and/or components of hardware layer 108. For example, hardware manager 210 may monitor the performance of one or more virtual machines 200. In a particular embodiment, hardware manager 210 may monitor the usage of CPUs 222 for one or more virtual machines 200 to determine whether the one or more virtual machines 200 have sufficient or excess processing capacity. In another embodiment, hardware manager 210 may monitor the memory usage of one or more virtual machines 200 to determine whether the virtual machines 200 are within a desired range of memory usage. As yet another embodiment, hardware manager 210 may monitor the applications 204 running one or more virtual machines 200, and/or other parameters or data sources, to determine priorities for one or more virtual machines 200. As still another embodiment, hardware manager 210 may monitor any combination of priority and hardware usage for a virtual machine 200 to determine whether it is necessary to reconfigure one or more hardware affinities for one or more virtual machines 200.

In certain embodiments, the monitoring may be performed by hardware manager 210 at discrete time intervals ("poll intervals"), typically measured in seconds. For example, the poll interval may be set at 30 seconds, 60 seconds, or at any other appropriate time interval as needed. In certain embodiments, the poll interval may vary based upon a pre-set schedule or in response to received information.

In certain embodiments, information received from monitoring one or more virtual machines 200 may be stored and/or analyzed to determine whether to modify the affinity of one or more hardware elements for the one or more virtual machines 200. In certain embodiments, the analysis is performed at discrete intervals ("analysis intervals"), typically set at a multiple of the poll interval. Although any appropriate analysis interval may be used, in a particular embodiment, the poll interval may be set at 30 seconds and the analysis interval may be set at 60 seconds. In another particular embodiment, the poll interval may be set at 30 seconds and the analysis interval may be set such that the analysis is performed after every 30th poll (i.e., every 15 minutes). In certain embodiments, it is the analysis interval may be set to at least three times the poll interval so that information received at each poll interval may be processed using at least three data points. In this way, the analysis of temporary fluctuations will be less likely to result in unnecessary affinity changes. In particular embodiments, the analysis interval is set between 10 and 15 minutes.

In certain embodiments, the poll interval and/or the analysis interval may be established by a system administrator, by a program developer, by a system user, and/or by any other appropriate individual or system as needed.

In certain embodiments, for example, in response to a determination that one or more particular virtual machines 200 have processing resources that are under-utilized, the one or more virtual machines 200 may be dynamically reconfigured such that they have affinity with fewer CPUs 222. As another example, in response to a determination that one or more virtual machines 200 have processing resources that are over-utilized, the one or more virtual machines 200 may be dynamically reconfigured such that they have affinity with a greater number of CPUs 222. As described below in further detail, changing the affinity of one or more hardware elements may be performed dynamically based on substantially real-time performance characteristics and/or priority information.

FIG. 2B is a flowchart illustrating an example method 240 for managing one or more virtual machines 200, according to particular embodiments. At step 242, a request for a performance characteristic for at least one virtual machine 200 is generated, the virtual machine 200 being associated with a processing group including one or more CPUs 222. In certain embodiments, the performance characteristic may be the processor utilization for the at least one virtual machine 200. In certain embodiments, the performance characteristic may be priority information for the at least one virtual machine. In certain embodiments, the priority information for the at least one virtual machine 200 may include information set by a system user and/or based on an association with a system user. In certain embodiments, the priority information for the at least one virtual machine 200 may be based on one or more characteristics of one or more applications 204 running on the at least one virtual machine 200. For example, in a particular embodiment a high priority rating for a particular virtual machine 200 may be based on a high priority rating for an application 204 running on the virtual machine 200, with the high priority rating for the application 204 having been set by a system user. At step 244, a response to the generated request is received. At step 246, whether an increase in the number of CPUs 222 included in the processing group is required is automatically determined by analyzing the received response to the generated request. In certain embodiments, a determination that an increase is required may be based on a response indicating that the processor utilization for one or more virtual machines 200 is over-utilized. At step 248, at least one CPU 222 is added to the processing group, in response to a determination that an increase in the number of CPUs 222 is required. In certain embodiments, one or more of the steps of example method 240 may be performed by hardware manager 210 or by an application 204 interacting with hardware manager 210.

FIG. 3A is a flow chart illustrating an example method indicated generally at 260 for managing a plurality of virtual machines 200, according to particular embodiments. At step 262, the processing capacity for a plurality of virtual machines is monitored. In certain embodiments, the monitoring in step 262 may include generating a request for one or more performance characteristics for the plurality of virtual machines 200 and receiving a response to the generated request. In certain embodiments, the monitoring at step 262 may include comparing performance characteristics for one or more of the plurality of virtual machines 200 with one or more criteria. In a particular embodiment the one or more criteria may include one or more ranges for the performance characteristics. For example in a particular embodiment the criteria may include a range that corresponds to under utilization of a plurality of central processing units associated with the plurality of virtual machines, a range corresponding to normal utilization for the plurality of central processing units associated with the plurality of virtual machines, and/or a range corresponding to over utilization of the plurality of central processing units associated with the plurality of virtual machines. In particular embodiments the criteria may include a range corresponding to normal utilization for the processing capability for one or more of the plurality of virtual machines 200, and/or a range corresponding over utilization of the processing capability for one or more of the plurality of virtual machines 200.

At step 263, a determination is made as to whether the total processing capacity for the plurality of virtual machines is under utilized. At step 264, a determination is made as to whether the processing capacity for one or more virtual machines 200 is over utilized. If it is determined that the total processing capacity for the plurality of virtual machines is under utilized and the processing capacity for none of the one or more virtual machines is over utilized then the total processing capacity for the plurality of virtual machines is reduced at step 625. In certain embodiments reducing the total processing capacity may include removing one or more central processing units from the group of central processing units to which the plurality of virtual machines 200 has affinity. At step 266, a determination is made as to whether the total processing capacity for the plurality of virtual machines 200 is over utilized. At step 267, a determination is made as to whether the processing capacity for one or more of the plurality of virtual machines 200 is over utilized. At step 268, a determination is made as to whether additional processing resources are available. If a determination is made that additional processing resources are available and either the total processing capacity for the plurality of virtual machines is over utilized or the processing capacity for one or more virtual machines is over utilized then at step 269 the total processing capacity is increased. In certain embodiments, increasing the total processing capacity may include adding one or more CPUs 222 to the group of CPUs 222 associated with the plurality of virtual machines 200.

Figure 3B:
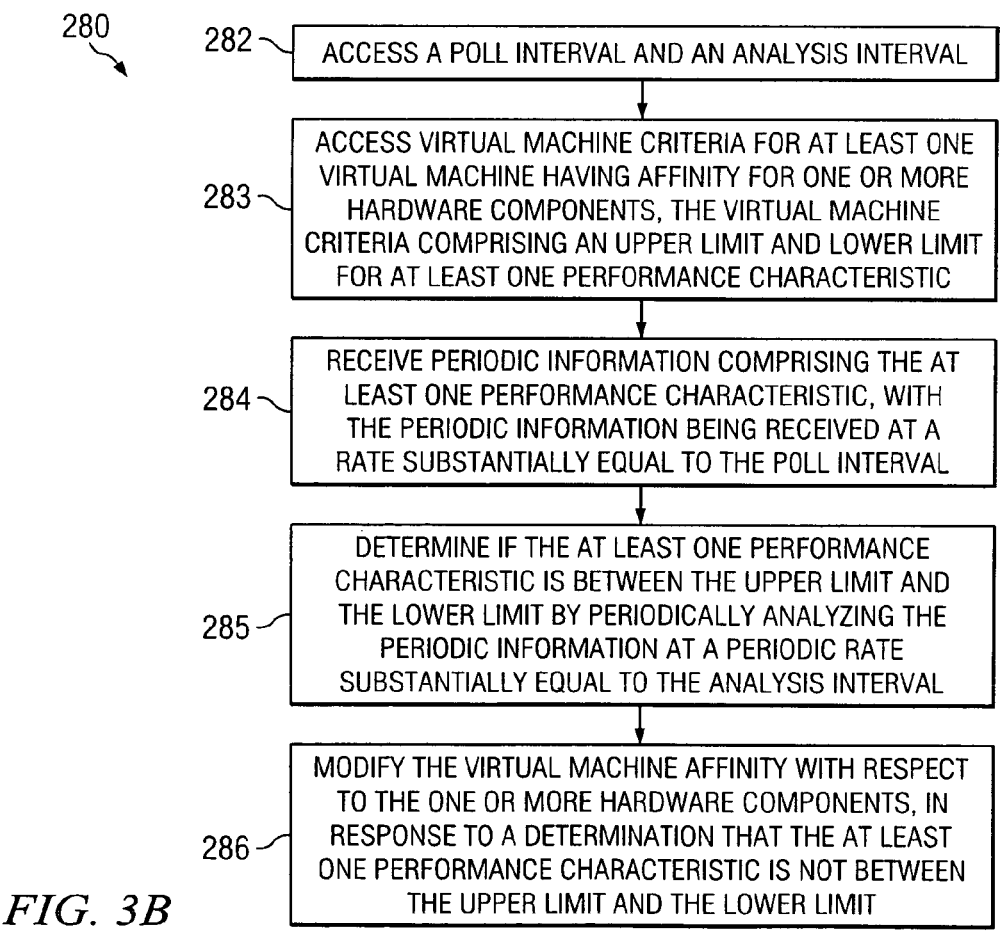

FIG. 3B is a flow chart, indicated generally at 280, illustrating an example method for managing one or more virtual machines 200 according to particular embodiments. At step 282, a poll interval and an analysis interval are accessed. At step 283, virtual machine criteria for at least one virtual machine 200 is accessed, the at least one virtual machine having affinity for one or more hardware components, the virtual machine criteria comprising an upper limit and a lower limit for at least one performance characteristic. At step 284, periodic information comprising the at least one performance characteristic is received, the periodic information being received at a rate substantially equal to the poll interval. At step 285, a determination is made as to whether the at least one performance characteristic is between the upper limit and the lower limit by periodically analyzing the periodic information at a periodic rate substantially equal to the analysis interval. At step 286, in response to a determination that the at least one performance characteristic is not between the upper limit and the lower limit, the virtual machine affinity is modified with respect to the one or more hardware components. In certain embodiment the poll interval may be in the range from one second to 120 seconds. In certain embodiments the analysis interval may be in the range from 5 minutes to 30 minutes. In certain embodiments the one or more hardware components include a plurality of CPUs 222, which may be included within a single server. In alternative embodiments, the one or more hardware components may comprise a plurality of CPUs 222 distributed among various locations.

Figure 4C:
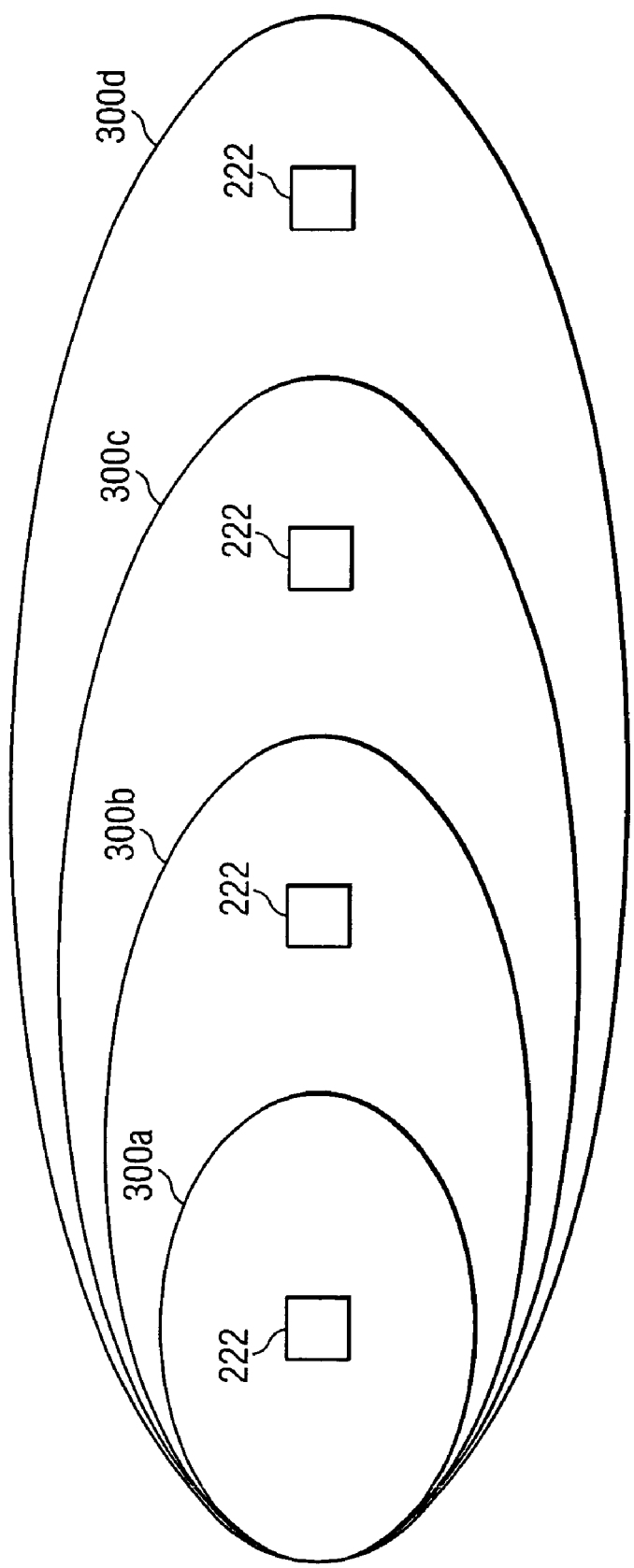

FIGS. 4A-4C illustrate example techniques for assigning resource affinity in virtual infrastructure 100, according to particular embodiments. In certain embodiments, the management of one or more virtual machines 200 may be performed through the use of buckets 300. Bucket 300 may represent a logical entity used to describe groupings of hardware elements. Different buckets 300 may be used to identify different groupings of hardware elements representing different hardware elements, different sized groups, different performance capabilities, etc. For example, in the embodiments shown in FIGS. 4A-4C, buckets 300 may be used to identify different groupings of CPUs 222, with incremental buckets 300 including all of the CPUs 222 from the previous bucket 300, together with additional CPUs 222. For example, as shown in FIG. 4A, bucket 300a may represent two CPUs 222; bucket 300b may represent the two CPUs 222 from bucket 300a together with two additional CPUs 222; bucket 300c may represent the four CPUs 222 from buckets 300a and 300b together with two additional CPUs 222; and bucket 300d may represent the six CPUs 222 from buckets 300a, 300b, and 300c together with two additional CPUs 222. Alternatively, as shown in FIGS. 4B and 4C, the incremental number of hardware elements in each bucket may vary. Although not shown, in certain embodiments, the group of hardware elements included within incremental buckets 300 may not include hardware elements included within previous buckets 300.

In certain embodiments, the specific hardware element included within a bucket 300 may change over time. For example, if a specific hardware element included within bucket 300 needs maintenance, another hardware element may be dynamically substituted within bucket 300, without affecting the virtual machines 200 and applications 204 running on the CPUs 222 associated with bucket 300.

In operation, each virtual machine 200 associated with a particular hardware manager 210 may be assigned to a particular bucket 300. In certain embodiments, the initial bucket assignment may be based on prior usage, based on a particular setting or characteristic of individual virtual machines 200 (or an entire group of virtual machines 200), or based on a default setting for all of the virtual machines 200 associated with hardware manager 210. As hardware manager 210 monitors and analyzes the virtual machines 200, if hardware manager 210 determines that the one or more hardware affinities for virtual machine 200 need to be reconfigured, then hardware manager 210 may use buckets 300 to affect this reconfiguration.

As a particular example, suppose that hardware manager 210 has a total of 32 CPUs 222 that may be allocated to virtual machines 200. Based upon certain settings, which may be established by a system user or system administrator, hardware manager may initially allocate eight of these CPUs for use by the virtual machines 200. These eight CPUs may then be associated with four different buckets, as shown in FIG. 4A, such that the number of CPUs in each bucket increases from bucket 300a to 300d, with all eight CPUs 222 being associated with bucket 300d. In this embodiment, each virtual machine 200 would be associated with one of these four buckets. In certain embodiments, the association between each virtual machines 200 and these buckets 300 may be based, at least in part, upon the priority of each virtual machine 200 and/or the priority of applications 204 running on each virtual machine 200. (Further description of such priority allocation is set forth below in relation to FIG. 5.)

In this example embodiment, if hardware manager 210 determines that one or more virtual machines 200 are over-utilizing their processing resources, hardware manager may allocate additional CPUs 222 to each of the four buckets 300, as shown in FIG. 4B. On the other hand, if none of the virtual machines 200 are over-utilizing their processing resources, and some of the virtual machines 200 are under-utilizing their processing resources, then hardware manager 210 may remove some of the CPUs 222 from the four buckets, as shown in FIG. 4C.

In these embodiments, hardware manager 210 may be able to dynamically manage the allocation of hardware resources to substantially optimize hardware utilization and, in certain embodiments, to reduce hardware costs.

Although each of FIGS. 4A-4C illustrate the use of four buckets 300, any appropriate number of buckets may be utilized as suited for the particular virtual infrastructure 100. In addition, although each of FIGS. 4A-4C illustrate the use of equal incremental increases in the number of CPUs 222 from one bucket to the next, in alternative embodiments, any appropriate allocation of CPUs 222 may be utilized.

Figure 5:
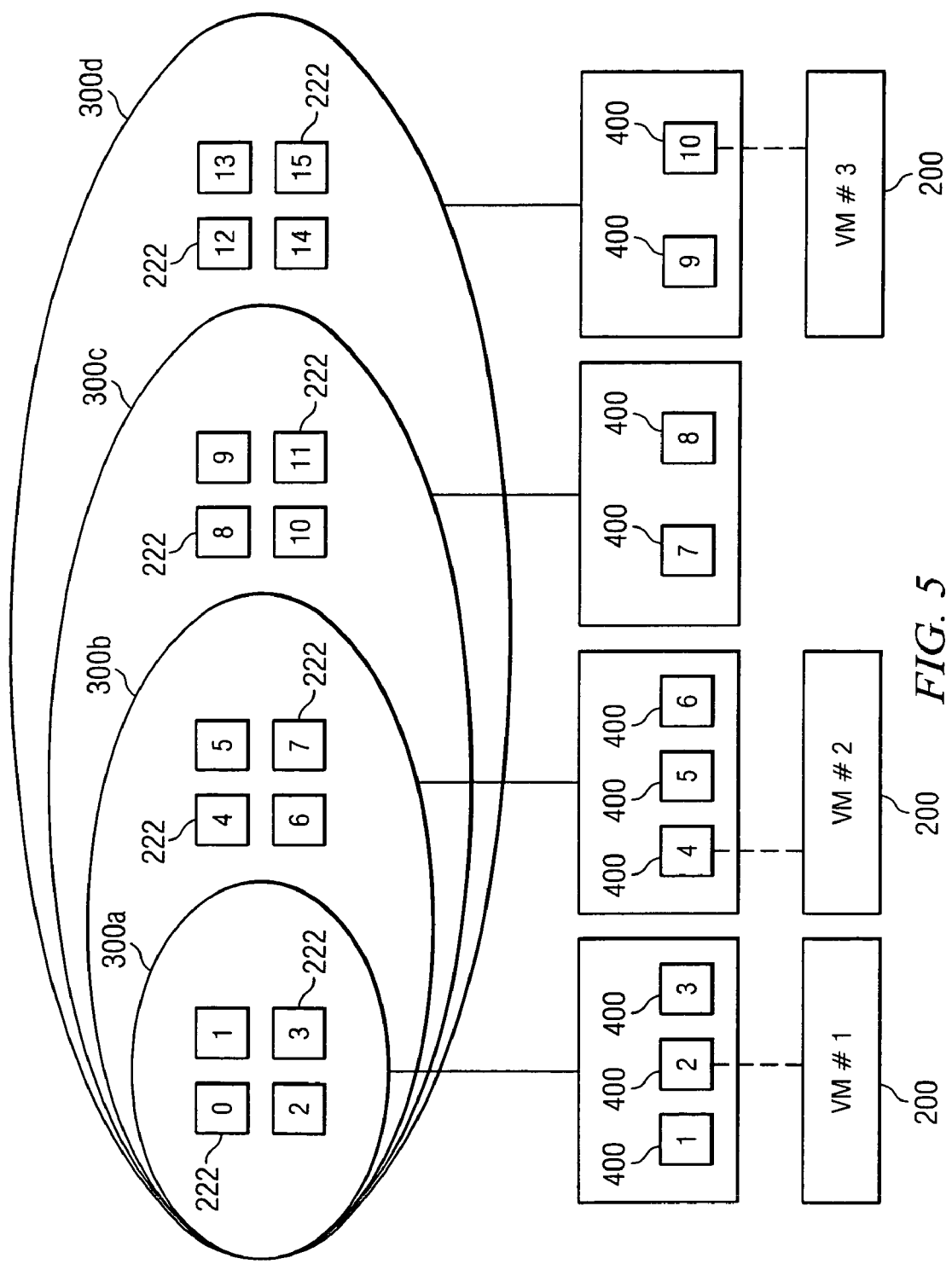
FIG. 5 illustrates an example technique for assigning resource affinity based on priority, according to particular embodiments.

FIG. 5 illustrates an example technique for assigning resource affinity based on priority, according to particular embodiments. In the embodiment shown, virtual machine priorities 400 range from a value of 1 to 10. Each virtual machine priority 400 is assigned to a particular bucket 300. In the embodiment shown, virtual machine priorities 400 in the range from 1 to 3 are assigned to bucket 300a; virtual machine priorities 400 in the range from 4 to 6 are assigned to bucket 300b; virtual machine priorities 400 in the range from 7 to 8 are assigned to bucket 300c; and virtual machine priorities 400 in the range from 9 to 10 are assigned to bucket 300d. As shown in FIG. 5, bucket 300a is associated with CPUs 222 numbered 0-3; bucket 300b is associated with CPUs 222 numbered 4-7; bucket 300c is associated with CPUs 222 numbered 8-11; and bucket 300d is associated with CPUs 222 numbered 12-15. In this embodiment, as the value of virtual machine priority 400 increases, the number of hardware elements available to the virtual machine 200 will also increase. In this way, virtual machines that are assigned a high (or higher) priority will have additional hardware resources with which to run their applications 204.

In certain embodiments, priorities may be assigned based upon particular virtual machines 200, particular applications 204, particular uses for an application 204, particular system users, and/or for any other appropriate characteristic, feature, or scenario. In certain embodiments, such priority information may be established by a system administrator, by a program developer, by a system user, and/or by any other appropriate individual as needed. In certain embodiments, the priority 400 of a particular virtual machine 200 may be based on the business priority of the work performed by that particular virtual machine 200, or by a user associated with that particular virtual machine 200. In certain embodiments, the priority of a particular virtual machine 200 may be based on the business priority of the work performed by one or more applications 204 running on the particular virtual machine 200. Although, in certain embodiments, priority 400 for a particular virtual machine 200 may be set by a user based on any appropriate logic, reasoning, or allocation approach.

In certain embodiments, a combination of virtual machine priority 400 and hardware utilization may be utilized to determine which bucket a virtual machine 200 should be assigned. For example, if a virtual machine 200 has a priority which is associated with bucket 300b, in FIG. 5, and it is determined that its processing capability is over-utilized, then, in certain embodiments, the virtual machine 200's affinity may be reconfigured to have affinity with the hardware elements in bucket 300c, in FIG. 5.

In certain embodiments, hardware element affinity for one or more virtual machines 200 may be adjusted based on the performance of one or more than one virtual machine. For example, hardware manager 210 may be associated with a large number of virtual machines and may manage hardware element allocations based on the performance of all of those virtual machines 200 viewed as a group. For example, hardware manager 210 may monitor CPU 222 usage for all of the virtual machines associated with the hardware manager 210 to determine whether, when viewed as a group, the processing capability is under- or over-utilized. In particular embodiments, hardware manager 210 may adjust the affinities for CPUs 222 for all of the associated virtual machines 200, as a group. In alternative embodiments, if hardware manager 210 determines that the processor usage for one or more virtual machines 200 is over-utilized, hardware manager 210 may increase the affinity for CPUs 222 for only those virtual machines 200 that have high (or higher) priority. In these embodiments, hardware manager 210 may be able to manage the hardware resources for an entire group of virtual machines 200, and may be able to manage these resources taking into consideration certain business needs and/or priorities. Through the use of these embodiments, hardware manager 210 may be able to reduce the amount of hardware resources utilized by a group of virtual machines 200.

In certain embodiments, hardware allocation within virtual infrastructure 100 may be managing based on processor utilization, memory utilization, or both. In certain embodiments, the primary focus of the optimization may be set by a system administrator, by a program developer, by a system user, and/or by any other appropriate individual as needed. For example, in certain embodiments, a system administrator may determine that the critical resource in the particular virtual infrastructure 100 is processing. In this embodiment, hardware manager 210 may be able to allocate system resources in such a way as to minimize the number of CPUs 222 utilized by the virtual machines 200. As another example, a system administrator may determine that the critical resource in virtual infrastructure 100 is memory. In this embodiment, hardware manager 210 may be able to allocate system resources in such a way as to minimize the number of memory modules 224 utilized by the virtual machines 200. As yet another example, a system administrator may develop a relationship between the cost of memory resources and processing resources and hardware manager 210 may be able to allocate hardware resources in a way that optimizes the total cost for the virtual infrastructure, taking into account both of these hardware elements.

FIG. 6 is a flow chart, indicated generally at 320, illustrating an example method for managing one or more virtual machines 200, according to particular embodiments. At step 322, priority information for a plurality of virtual machines 200 is received. At step 324, each of the plurality of virtual machines 200 is assigned to one of a plurality of groups of CPUs 222, such that each of the plurality of virtual machines 200 has affinity with all of the CPUs 222 in the group to which it is assigned. In certain embodiments the assignment of each of the plurality of virtual machines may be based on the received priority information from step 322.

FIG. 7 illustrates an embodiment of a general purpose computer 500 that may be used in connection with one or more pieces of software used to implement the invention. General purpose computer 500 may generally be adapted to execute any of the well-known OS2, UNIX, Mac-OS, Linux, and Windows Operating Systems or other operating systems. The general purpose computer 500 in this embodiment comprises a processor 502, a random access memory (RAM) 504, a read only memory (ROM) 506, a mouse 508, a keyboard 510 and input/output devices such as a printer 514, disk drives 512, a display 516 and a communications link 518. In other embodiments, the general purpose computer 500 may include more, less, or other component parts. Embodiments of the present invention may include programs that may be stored in the RAM 504, the ROM 506 or the disk drives 512 and may be executed by the processor 502. The communications link 618 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 512 may include a variety of types of storage media such as, for example, floppy disk drives, hard disk drives, CD ROM drives, DVD ROM drives, magnetic tape drives or other suitable storage media.

Although FIG. 7 provides one embodiment of a computer that may be used with the invention, the invention may additionally utilize computers other than general purpose computers as well as general purpose computers without conventional operating systems. Additionally, embodiments of the invention may also employ multiple general purpose computers 500 or other computers networked together in a computer network. Most commonly, multiple general purpose computers 500 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 7, the logic comprises computer software executable on the general purpose computer 500. The medium may include the RAM 504, the ROM 506 or the disk drives 512. In other embodiments, the logic may be contained within hardware configurations or a combination of software and hardware configurations. The logic may also be embedded within any other suitable medium without departing from the scope of the invention.

Although the present invention has been described with several embodiments, a plenitude of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. An apparatus for use in managing virtual machines, the apparatus comprising:
a processor; and
a memory accessible by the processor, the memory storing software executable by the processor to:
generate a request for at least one performance characteristic for a plurality of virtual machines, the plurality of virtual machines being associated with a processing group including a plurality of processing modules;
receive a response to the generated request, the response comprising a plurality of performance characteristics for the plurality of virtual machines;
determine whether a total processing capacity for the plurality of virtual machines is over or under utilized;
based on at least one of the plurality of performance characteristics, determine whether each of the plurality of virtual machines are over or under utilized;
in response to a determination that the total processing capacity for the plurality of machines is under utilized and that the processing capacity for none of the plurality of virtual machines is over utilized, remove at least one of the plurality of processing modules within the processing group with which the plurality of virtual machines is associated; and
in response to a determination that the total processing capacity for the plurality of virtual machines is over utilized or that the processing capacity for one or more of the plurality of virtual machines is over utilized, adding at least one processing module to the plurality of processing modules within the processing group with which the plurality of virtual machines is associated, and
wherein the at least one of the plurality of performance characteristics comprises a business priority rating associated with a selected virtual machine, the business priority rating based on a business need of the selected virtual machine and calculated based on a set priority rating assigned to the selected virtual machine and a plurality of set priority ratings assigned to each of a plurality of applications running on the selected virtual machine.

2. The apparatus of claim 1, wherein the software is further executable by the processor to:
periodically generate the request for the plurality of performance characteristics for the plurality of virtual machines, the request generated at a rate substantially equal to a poll interval;
periodically determine whether a total processing capacity for the plurality of virtual machines is over or under utilized, the determination made at a rate substantially equal to an analysis interval; and
periodically determine whether each of the plurality of virtual machines are over or under utilized, the determination made at a rate substantially equal to the analysis interval, and wherein the analysis interval is a multiple of the poll interval and is at least three times the poll interval.

3. The apparatus of claim 2, wherein the poll interval varies based on information received from the plurality of virtual machines.

4. The apparatus of claim 1, wherein the plurality of processing modules comprise a plurality of central processing units included within a single server.

5. The apparatus of claim 1, wherein the business priority rating is a sum of the set priority rating assigned to the selected virtual machine and the plurality of set priority ratings assigned to each of the plurality of applications running on the selected virtual machine.

6. The apparatus of claim 1, wherein the software is further executable by the processor to assign each of the plurality of virtual machines to one of a plurality of buckets such that each bucket is associated with a group of hardware components, the plurality of buckets comprising a first bucket and a second bucket, with the group of hardware components associated with the first bucket being a subset of the group of hardware components associated with the second bucket, the second bucket having a higher business priority than the first bucket.

7. The apparatus of claim 6, wherein each hardware component associated with the group of hardware components of the first bucket is selected from the group consisting of one or more central processing units and one or more memory modules.

8. The apparatus of claim 6, wherein the plurality of buckets further comprises a third bucket, with the group of hardware components associated with the second bucket being a subset of the group of hardware components associated with the third bucket.

9. The apparatus of claim 1, wherein at least one of the plurality of performance characteristics comprises a processor load utilization for each of the plurality of virtual machines.

10. A method for managing one or more virtual machines, the method comprising:
   using at least one computer processor to generate a request for at least one performance characteristic for a plurality of virtual machines, the plurality of virtual machines being associated with a processing group including a plurality of processing modules;
   receiving a response to the generated request, the response comprising a plurality of performance characteristics for the plurality of virtual machines;
   using the at least one computer processor to determine whether a total processing capacity for the plurality of virtual machines is over or under utilized;
   based on at least one of the plurality of performance characteristics, using the at least one computer processor to determine whether each of the plurality of virtual machines are over or under utilized;
   in response to a determination that the total processing capacity for the plurality of machines is under utilized and that the processing capacity for none of the plurality of virtual machines is over utilized, removing at least one of the plurality of processing modules within the processing group with which the plurality of virtual machines is associated; and
   in response to a determination that the total processing capacity for the plurality of virtual machines is over utilized or that the processing capacity for one or more of the plurality of virtual machines is over utilized, adding at least one processing module to the plurality of processing modules within the processing group with which the plurality of virtual machines is associated, and wherein the at least one of the plurality of performance characteristics comprises a business priority rating associated with a selected virtual machine, the business priority rating based on a business need of the selected virtual machine and calculated based on a set priority rating assigned to the selected virtual machine and a plurality of set priority ratings assigned to each of a plurality of applications running on the selected virtual machine.

11. The method of claim 10, further comprising:
   periodically generating the request for the plurality of performance characteristics for the plurality of virtual machines, the request generated at a rate substantially equal to a poll interval;
   periodically determining whether a total processing capacity for the plurality of virtual machines is over or under utilized, the determination made at a rate substantially equal to an analysis interval; and
   periodically determining whether each of the plurality of virtual machines are over or under utilized, the determination made at a rate substantially equal to the analysis interval, and
   wherein the analysis interval is a multiple of the poll interval and is at least three times the poll interval.

12. The method of claim 11, wherein the poll interval varies based on information received from the plurality of virtual machines.

13. The method of claim 10, wherein the plurality of processing modules comprise a plurality of central processing units included within a single server.

14. The method of claim 10, wherein the business priority rating is a sum of the set priority rating assigned to the selected virtual machine and the plurality of set priority ratings assigned to each of the plurality of applications running on the selected virtual machine.

15. The method of claim 10, further comprising assigning each of the plurality of virtual machines to one of a plurality of buckets such that each bucket is associated with a group of hardware components, the plurality of buckets comprising a first bucket and a second bucket, with the group of hardware components associated with the first bucket being a subset of the group of hardware components associated with the second bucket, the second bucket having a higher business priority than the first bucket.

16. The method of claim 15, wherein each hardware component associated with the group of hardware components of the first bucket is selected from the group consisting of one or more central processing units and one or more memory modules.

17. The method of claim 15, wherein the plurality of buckets further comprises a third bucket, with the group of hardware components associated with the second bucket being a subset of the group of hardware components associated with the third bucket.

18. The method of claim 10, wherein at least one of the plurality of performance characteristics comprises a processor load utilization for each of the plurality of virtual machines.

19. A non-transitory computer-readable medium encoded with software for use in managing a plurality of virtual machines each having processing capability through association with one or more of a plurality of central processing units, the software executed using one or more processors to:
   generate a request for at least one performance characteristic for a plurality of virtual machines, the plurality of virtual machines being associated with a processing group including a plurality of processing modules;

receive a response to the generated request, the response comprising a plurality of performance characteristics for the plurality of virtual machines;
determine whether a total processing capacity for the plurality of virtual machines is over or under utilized;
based on at least one of the plurality of performance characteristics, determine whether each of the plurality of virtual machines are over or under utilized;
in response to a determination that the total processing capacity for the plurality of machines is under utilized and that the processing capacity for none of the plurality of virtual machines is over utilized, remove at least one of the plurality of processing modules within the processing group with which the plurality of virtual machines is associated; and
in response to a determination that the total processing capacity for the plurality of virtual machines is over utilized or that the processing capacity for one or more of the plurality of virtual machines is over utilized, add at least one processing module to the plurality of processing modules within the processing group with which the plurality of virtual machines is associated, and
wherein the at least one of the plurality of performance characteristics comprises a business priority rating associated with a selected virtual machine, the business priority rating based on a business need of the selected virtual machine and calculated based on a set priority rating assigned to the selected virtual machine and a plurality of set priority ratings assigned to each of a plurality of applications running on the selected virtual machine.

20. The non-transitory computer-readable medium claim 19, wherein the software is further executed using one or more processors to:
periodically generate the request for the plurality of performance characteristics for the plurality of virtual machines, the request generated at a rate substantially equal to a poll interval;
periodically determine whether a total processing capacity for the plurality of virtual machines is over or under utilized, the determination made at a rate substantially equal to an analysis interval; and
periodically determine whether each of the plurality of virtual machines are over or under utilized, the determination made at a rate substantially equal to the analysis interval, and
wherein the analysis interval is a multiple of the poll interval and is at least three times the poll interval.

21. The non-transitory computer-readable medium of claim 20, wherein the poll interval varies based on information received from the plurality of virtual machines.

22. The non-transitory computer-readable medium of claim 19, wherein the plurality of processing modules comprise a plurality of central processing units included within a single server.

23. The non-transitory computer-readable medium of claim 19, wherein the business priority rating is a sum of the set priority rating assigned to the selected virtual machine and the plurality of set priority ratings assigned to each of the plurality of applications running on the selected virtual machine.

24. The non-transitory computer-readable medium of claim 19, wherein the software is further executed using one or more processors to:
assign each of the plurality of virtual machines to one of a plurality of buckets such that each bucket is associated with a group of hardware components, the plurality of buckets comprising a first bucket and a second bucket, with the group of hardware components associated with the first bucket being a subset of the group of hardware components associated with the second bucket, the second bucket having a higher business priority than the first bucket.

25. The non-transitory computer-readable medium of claim 24, wherein each hardware component associated with the group of hardware components of the first bucket is selected from the group consisting of one or more central processing units and one or more memory modules.

26. The non-transitory computer-readable medium of claim 24, wherein the plurality of buckets further comprises a third bucket, with the group of hardware components associated with the second bucket being a subset of the group of hardware components associated with the third bucket.

27. The non-transitory computer-readable medium of claim 19, wherein at least one of the plurality of performance characteristics comprises a processor load utilization for each of the plurality of virtual machines.

* * * * *

UNITED STATES PATENT AND TRADEMARK OFFICE
CERTIFICATE OF CORRECTION

PATENT NO. : 8,104,033 B2
APPLICATION NO. : 11/241155
DATED : January 24, 2012
INVENTOR(S) : Michael R. Chiaramonte et al.

It is certified that error appears in the above-identified patent and that said Letters Patent is hereby corrected as shown below:

Title Page, Item (54) and at Column 1, lines 1 and 2, Title should read:
"MANAGING VIRTUAL MACHINES BASED ON BUSINESS PRIORITY"

Signed and Sealed this
Twenty-ninth Day of May, 2012

David J. Kappos
*Director of the United States Patent and Trademark Office*